(12) United States Patent
Diosdado Borrego et al.

(10) Patent No.: US 12,709,063 B2
(45) Date of Patent: Aug. 18, 2026

(54) PROCESSING BUILD MATERIALS

(71) Applicant: Peridot Print LLC, Palo Alto, CA (US)

(72) Inventors: Jorge Diosdado Borrego, Sant Cugat del Valles (ES); Rocio Munoz Moreno, Sant Cugat del Valles (ES); Natalie Harvey, Corvallis, OR (US); Marc Garcia Grau, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 37 days.

(21) Appl. No.: 18/705,122

(22) PCT Filed: Oct. 27, 2021

(86) PCT No.: PCT/US2021/056786

§ 371 (c)(1),
(2) Date: Apr. 26, 2024

(87) PCT Pub. No.: WO2023/075760

PCT Pub. Date: May 4, 2023

(65) Prior Publication Data

US 2025/0236072 A1 Jul. 24, 2025

(51) Int. Cl.

| | |
|---|---|
| ***B29C 64/35*** | (2017.01) |
| ***B29C 64/357*** | (2017.01) |
| ***B29C 64/379*** | (2017.01) |
| ***B33Y 40/20*** | (2020.01) |

(52) U.S. Cl.

CPC ............ *B29C 64/35* (2017.08); *B29C 64/357* (2017.08); *B29C 64/379* (2017.08); *B33Y 40/20* (2020.01)

(58) Field of Classification Search

CPC ..... B29C 64/35; B29C 64/379; B29C 64/357; B33Y 40/20

See application file for complete search history.

(56) References Cited

U.S. PATENT DOCUMENTS

2011/0300248 A1* 12/2011 Tung ...................... B33Y 30/00 425/90
2012/0257175 A1* 10/2012 Shi ........................ B29C 64/393 355/22

(Continued)

FOREIGN PATENT DOCUMENTS

| | | | |
|---|---|---|---|
| EP | 3517298 | A1 | 7/2019 |
| WO | 2019/108288 | A1 | 6/2019 |
| WO | 2020/222787 | A1 | 11/2020 |

*Primary Examiner* — Nahida Sultana
(74) *Attorney, Agent, or Firm* — Michael Dryja

(57) ABSTRACT

A build material processing system is disclosed. The system comprising a build volume interface to receive a container including a build volume comprising a plurality of powdered build material layers in which an agent has been selectively applied to define a 3D object; and at least one type of build material removing device. The system further comprises a controller to control the build material removing device to extract a first portion of the build material layers in a first manner; control the build material removing device to subsequently extract a second portion of the build material layers in a second manner; and convey the extracted second portion of build material to a reconditioning unit.

18 Claims, 3 Drawing Sheets

(56) References Cited

U.S. PATENT DOCUMENTS

| | | | | |
|---|---|---|---|---|
| 2015/0367448 | A1* | 12/2015 | Buller | H05B 6/68 219/74 |
| 2017/0334140 | A1* | 11/2017 | Andersson | B29C 64/357 |
| 2018/0339466 | A1* | 11/2018 | El Naga | B22F 10/34 |
| 2019/0151904 | A1* | 5/2019 | Bauer | B08B 3/04 |
| 2021/0023795 | A1* | 1/2021 | Sosnowski | B29C 64/343 |
| 2021/0237158 | A1* | 8/2021 | Pavan | B22F 10/85 |
| 2022/0281171 | A1* | 9/2022 | Diosdado Borrego | B08B 5/02 |
| 2022/0331874 | A1* | 10/2022 | Diosdado Borrego | B22F 12/10 |

* cited by examiner 125
128
129
127

PROCESSING BUILD MATERIALS

BACKGROUND

Some additive manufacturing or three-dimensional printing systems generate 3D objects by selectively solidifying portions of a successively formed layers of build material on a layer-by-layer basis. The build material which has not been solidified is ultimately separated from the generated 3D objects.

BRIEF DESCRIPTION OF THE DRAWINGS

The present application may be more fully appreciated in connection with the following detailed description of non-limiting examples taken in conjunction with the accompanying drawings, in which like reference numerals refer to like parts throughout and in which.

DETAILED DESCRIPTION

Figures 1A, 1B:
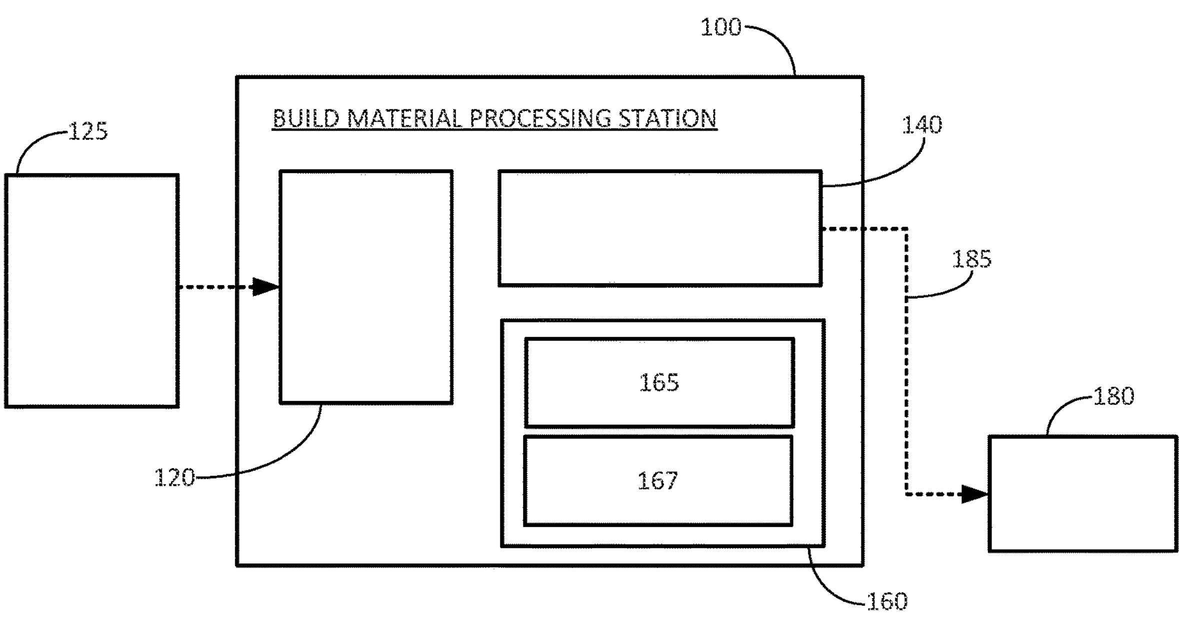
FIG. 1A schematically illustrates an example of a build material processing system.
FIG. 1B schematically illustrates an example of a container with a build bed.

The following description is directed to various examples of additive manufacturing, or three-dimensional printing, apparatus and processes involved in the generation of 3D objects. Throughout the present disclosure, the terms "a" and "an" are intended to denote at least one of a particular element. In addition, as used herein, the term "includes" means includes but not limited to, the term "including" means including but not limited to. The term "based on" means based at least in part on.

As used herein, the terms "about" and "substantially" are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable.

For simplicity, it is to be understood that in the present disclosure, elements with the same reference numerals in different figures may be structurally the same and may perform the same or similar functionality.

3D printers generate 3D objects based on data in a 3D model of an object or objects to be generated, for example, using a CAD computer program product. This data may be pre-processed by a computing system in a suitable format for the 3D printer. In some examples, the pre-processing may include arranging models of the 3D objects to be generated in a virtual build volume corresponding to the physical build volume in which the 3D objects are to be generated, for example the build volume of a 3D printer. A print job, or other print data, describing the arrangement of 3D objects models within the virtual build volume may be sent to the 3D printer to cause the printer to generate the 3D objects.

3D printers may generate 3D objects by selectively processing layers of build material. For example, a 3D printer may selectively treat portions of a layer of build material, e.g. a powder, corresponding to a slice of 3D object to be generated, thereby leaving the portions of the layer untreated in the areas where no 3D object is to be generated. The combination of the generated 3D objects and the untreated build material may also be referred to as build bed. The volume in which the build bed is generated may be referred to as a build volume.

Suitable powder-based build materials for use in additive manufacturing include polymer powder (e.g., Nylon, PA11, PA12, thermoplastic polyurethane, thermoplastic polyamide, polypropylene, etc.), metal powder (e.g., stainless steel) or ceramic powder. In some examples, non-powdered build materials may be used such as gels, pastes, and slurries.

Some 3D printers may selectively treat portions of a layer of build material by ejecting a printing fluid in a pattern corresponding to the 3D object and then apply energy to the layer. 3D printers may apply energy to the build material layer using, for example, an energy source. Examples of printing fluids may include fusing agents, detailing agents, curable binder agents or any printing fluid suitable for the generation of a 3D object.

In some examples, the agent is a fusing agent. A fusing agent is a liquid comprising energy absorbent particles (e.g., Carbon black) to absorb energy irradiated by an energy source (e.g., heating lamps). In other examples, the agent is a binder agent. In one example, the binder agent can include a binder in a liquid carrier or vehicle for application to the particulate build material.

In one example, the binder can include polymer particles, such as latex polymer particles. The polymer particles can have an average particle size that can range from about 100 nm to about 1 μm. In other examples, the polymer particles can have an average particle size that can range from about 150 nm to about 300 nm, from about 200 nm to about 500 nm, or from about 250 nm to 750 nm.

Some of the above referred agents need to be cured after printing. In the examples herein, a curing process may be understood as raising the temperature of a build bed such that a chemical reaction (e.g., polymerization) or a physical action (e.g., evaporation) takes place, resulting in a harder, tougher or more stable linkage of the build material particles in which the agent was ejected thereto. In an example, when using a thermally curable binder agent, after the printing process, the build material particles are attached to each other by way of the applied binder agent in a generally weakly bound form. This bond is strengthened by heating the whole volume of build material such that any binder agent therein thermally cures. After the curing operation the 3D objects may be separated from the un-solidified build material, for example after a suitable cooling period.

During the printing operation, binder agents tend to migrate to previously generated build material layers based on the permeability of the build material and the viscosity of the binder agent. In some examples, part of the solvents of the agent are evaporated through heating elements, which may be collected by an airflow. Furthermore, during the curing operation, solvents of the binder agent evaporate and migrate towards an end of the build bed where they may be extracted, for example using an airflow. Through the migration, the solvents may reach and merge with other portions of untreated build material from the build bed and may thereby contaminating said portions. As such, after the curing operation, some parts of the untreated build material portions include binder agent remnants (e.g., solvents)

thereby reducing the quality of the build material and its recyclability potential for subsequent print jobs.

To be able to recycle the untreated build material, it may be reconditioned to remove the binder agent remnants therein. In some examples, the build material is reconditioned by exposing it to thermal processes such that the binder agent remnants are removed (e.g., are burned-out), and the build material becomes useable for future print jobs. However, reconditioning all the untreated build material is long and consumes relatively high amounts of energy. The examples herein provide a process which separates the untreated build material in quality levels to be reconditioned differently and substantially increase the throughput and efficiency of the reconditioning process.

Referring now to the drawings, FIG. 1A is schematic diagram showing an example of a build material processing system 100. The build material processing system 100 is an apparatus capable of handling build material particles from a 3D printing system. In some examples, the build material processing system 100 is an external apparatus from a 3D printer but interacts either directly or indirectly with the 3D printer. In these examples, the 3D printer may interact with the build material processing system 100 through a moveable container 125. The 3D printer may generate or transfer the build bed to the moveable container 125, which is then transported and interfaced with the build material processing system 100. In other examples, however, the build material processing system 100 is an integral part of a 3D printer.

FIG. 1B schematically illustrates an example of a container 125, such as container 125 of FIG. 1A, including a build bed. The build bed comprises a 3D object 127 defined by binder agent applied by a 3D printer, and untreated build material (128, 129) which are portions of build material on which no binder agent was applied by a 3D printer. The container 125 is to be received by a build volume interface 120 of the build material processing system 100. It is to be noted that in the examples herein, the term "3D object" may include a fully fused or coalesced 3D object, a green part 3D object a brown part 3D object, or any other product of a 3D printer that is to be part or a byproduct of a 3D object product. In the examples herein, the terms green part and brown part refer to 3D objects generated through the ejection of a binder agent with respectively have and have not gone through a curing operation.

The build bed includes a plurality of powdered build material layers on which a binder agent has been selectively applied to define a 3D object 127. In order to recover the 3D printed object from the container 125 any untreated build material (128, 129) has to be removed from the container 125. The operation of separating the untreated build material from the 3D object is commonly known as "decaking". In some examples, the untreated part of build material is separated to be recycled and reused in subsequent print jobs. However, in some post-processing operations such as curing, some of the build material gets contaminated and it is to be reconditioned to be suitable for recycling purposes.

Different portions of the untreated build material may be contaminated with binder agent or binder agent components to different degrees. Analysis of real 3D printing shows that the neighboring portions 129 of the 3D object 127 tend to be more contaminated than the portions 128 which are further away. This is caused due to the binder agent leakage to portions of build material layers surrounding the object 127. It is also shown that the portions of build material which are further away from the 3D object (e.g., portions 128) may also be contaminated due to the binder solvents migration happening in some post-processing techniques, such as curing. However, these further away portions 128 might be contaminated at a lower contamination degree than the portions 127 which are closer to the 3D object 129 since the present solvent density is lower.

The build material processing system 100 comprises at least one type of build material removing device 140. The build material removing device 140 is to remove at least a part of the untreated build material. Additionally, in some examples, the build material processing system 100 may include a plurality of build material removing devices 140. In these examples, the build material processing system 100 comprises a first and a second build material removing devices, which might be of the same type or of a different type. Examples of types of build material removing devices 140 may include a vibrating mechanism, a blowing device, a suction device, a brush, an acoustic resonator and/or a magnet. In a specific example, the first build material removing device is a vibrating mechanism and the second build material removing device is a blowing device.

In some examples, the build material processing system 100 comprises a reconditioning unit 180 to treat build material to remove any residual agents or agent components therefrom. In some examples, the reconditioning unit 180 may be an external unit which is connectable to the build material processing system 100 through powder transportation means 185. In other examples, however, the reconditioning unit 180 is an integral part of the build material processing system 100 which is connectable to the build volume interface through the powder transportation means 185. In some examples, the powder transportation means 185 include air conveying mechanisms (i.e., ducts with pumps and/or fans). In other examples, the powder transportation means 185 include transporting the build material through containers (e.g., boxes for example made of metal).

The reconditioning unit 180 treats build material to remove any traces in the build material of the printing agents or components thereof. In some examples, the reconditioning unit 180 may thermally treat the residual agents by, for example, raising the temperature of the build unit to a predetermined temperature for a predetermined time to burnout the residual agents or solvents. In these examples, the reconditioning unit 180 includes a set of heaters. In other examples, the reconditioning unit 180 may wash the build material placed therein to remove the residual agents therefrom. In these examples, the reconditioning unit 180 includes a set of conduits or hoses connectable to a liquid tank (e.g., water).

The build material processing system 100 comprises a controller 160. The controller 160 comprises a processor 165 and a memory 167 with specific control instructions to be executed by the processor 165. The functionality of the controller 160 is described further below with reference to FIG. 2.

In the examples herein, the controller 160 may be any combination of hardware and programming that may be implemented in a number of different ways. For example, the programming of modules may be processor-executable instructions stored in at least one non-transitory machine-readable storage medium and the hardware for modules may include at least one processor to execute those instructions. In some examples described herein, multiple modules may be collectively implemented by a combination of hardware and programming. In other examples, the functionalities of the controller 160 may be, at least partially, implemented in the form of an electronic circuitry. The controller 160 may be a distributed controller, a plurality of controllers, and the like. In the examples herein, build material removal devices are controlled to independently remove different portions of the build material of a build bed and thermally process each portion differently.

Figure 2:
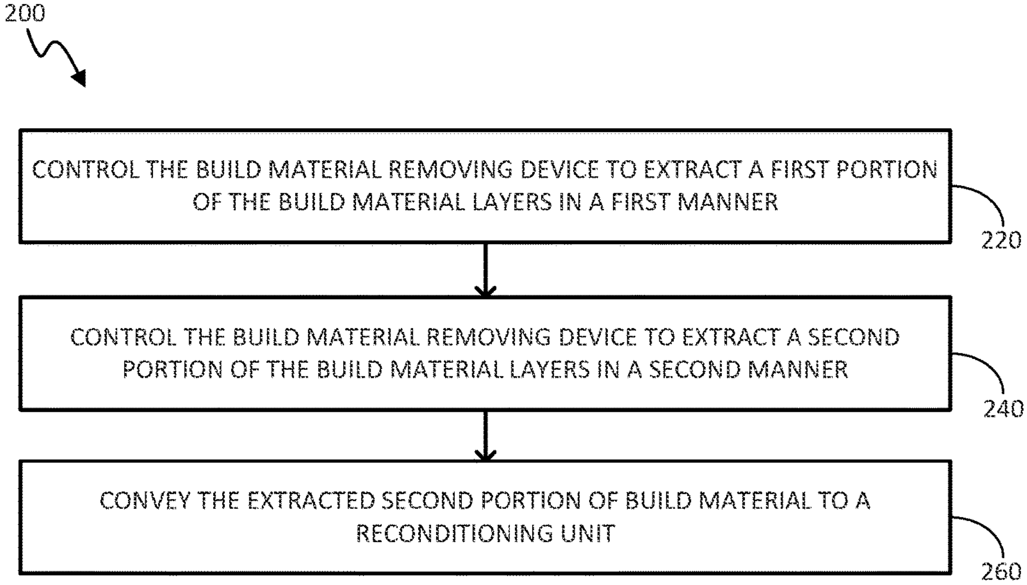
FIG. 2 is a flowchart of an example method of processing additive manufacturing build material.

FIG. 2 is a flowchart of an example method 200 to process additive manufacturing build material, for example metal build material particles. The blocks 220-260 from method 200 correspond to instructions of which when executed, cause the processor 165 of the controller 160 of FIG. 1A to perform the method 200 of FIG. 2.

The container 125 including a build bed is received in the build volume interface 120. As mentioned above, the build bed includes a plurality of powdered build material layers in which a binder agent has been selectively applied to define a 3D object 127.

At block 220, the controller 160 controls the build material removing device 140 in a first manner, which is intended to extract a first portion of the build material (i.e. build material 128) At block 240, the controller 160 controls the build material removing device 140 in a second manner, which is intended to extract a second portion of the build material (e.g. build material 129).

The build material in the neighboring portions 129 of the 3D object 127 tend to be more agglomerated and contaminated with agent remnants or components than the portion of build material 128. In some examples, part of the first portion of build material might be attached (e.g., bounded) to the 3D object 127. As such, the build material of the neighboring portions 129 of the 3D object 127 tend to be of a lower quality level, and thereby needs additional post-processing to be recyclable than the build material portions 128 located further away from the 3D objects 127.

The build material removing device 140 is fluidically connected to the transportation means 185 which conveys the removed build material particles to, for example, the reconditioning unit 180. In some examples, the build material removing device 140 extracts the build material particles to an intermediate container which is fluidically connected to the transportation means 185. Additionally, in some examples, the build material removing device 140 deposits the build material extracted in the first manner in a first intermediate container and deposits the build material extracted in the second manner in a second intermediate container. The intermediate containers may be fluidically connected to the transportation means 185. In that way, being able to separate the different types of build material enables the system to recondition them differently in the reconditioning unit 180. In some examples, recondition only one type of build material (e.g., build material 129) is also considered as a different type of reconditioning.

In some examples, the build material removing device may include a single type of build material removal mechanism, for example, a vibration mechanism which is controlled to vibrate in a first vibrating mode (block 220) and then controlled to vibrate at a second vibrating mode (block 240). The different vibrating modes may include vibrating at different frequencies and amplitudes. In an example, the first vibrating mode is to vibrate at a higher amplitude and lower frequency than in the second vibrating mode to remove portions of build material that are located further away from the 3D object.

In other examples, the first and second build material removal portions may be extracted through different build material removal processes. In some examples, each build material removal process may be executed by a different build material removal device. Some examples of build material removal devices may include at least one or a subset of a vibrating mechanism, a blowing device, a suction device, a brush, an acoustic resonator and/or a magnet.

In a specific example, the first build material removing device is a vibrating mechanism and the second build material removing device is a blowing device. In an example, the first build material removal device is a vibrating mechanism to vibrate and extract (e.g., through a sieved platform, porous platform, platform with perforations) the build material 128 located further away from the 3D object 127; and the second build material removal device is a blowing device (e.g., airknife, a set of blowing nozzles) connectable to a gas tank (e.g., air) to blow and remove the build material which is located at the neighboring portions 129 of the 3D object 127, which becomes airborne and might be collected by a vacuum device connectable to the transportation means 185.

The controller 160 is further to control the transportation means 185 (e.g., fan, pump) to convey the extracted second portion of build material to the reconditioning unit 180 where it is treated according to the examples described herein. In some examples, the build material is conveyed to the reconditioning unit 180.

Once in the reconditioning unit 180, the second portion of build material is treated to remove any residual agent components therein. In some examples, the build material is washed in the reconditioning unit 180. In other examples, the reconditioning unit 180 executes a thermal treatment to the build material by increasing the temperature for a predetermined amount of time. In some examples, the amount of time depends on the volume of build material to be treated. In examples, the reconditioning unit 180 is to treat the second portion of build material by raising the temperature to a temperature ranging from about 220° C. to about 260° C. for a time from the range of 7 to 9 hours; for example, raising the temperature of the second build material to 240° C. for 8 hours. In other examples, other temperature and time ranges may apply.

In additional examples, the first portion of build material may also be reconditioned in a reconditioning unit 180. However, the first portion of build material may be thermally treated at a lower temperature and/or for a shorter time compared to the reconditioning conditions of the second portion of build material.

Additionally, or alternatively, the controller 160 may further receive an input indicative of the quality level of the second portion of build material. The residual agent components density, or contamination degree, increases the viscosity of the powder to a more "muddier" appearance which is visible to the human eye. Because of that, in some examples, the input may be a manual input from the user. In other examples, the build material processing system 100 may further comprise a sensing module with at least one sensory element (e.g., optical sensor) to automatically determine the quality level of the second portion of build material. Other suitable ways to determine the quality level of the second portion of the build material may also be used (see, e.g., FIG. 5). In these examples, a controlling unit (e.g., the controller 160) may control the reconditioning unit 180 to treat the second portion of build material differently based on the inputted quality level.

Figure 3:
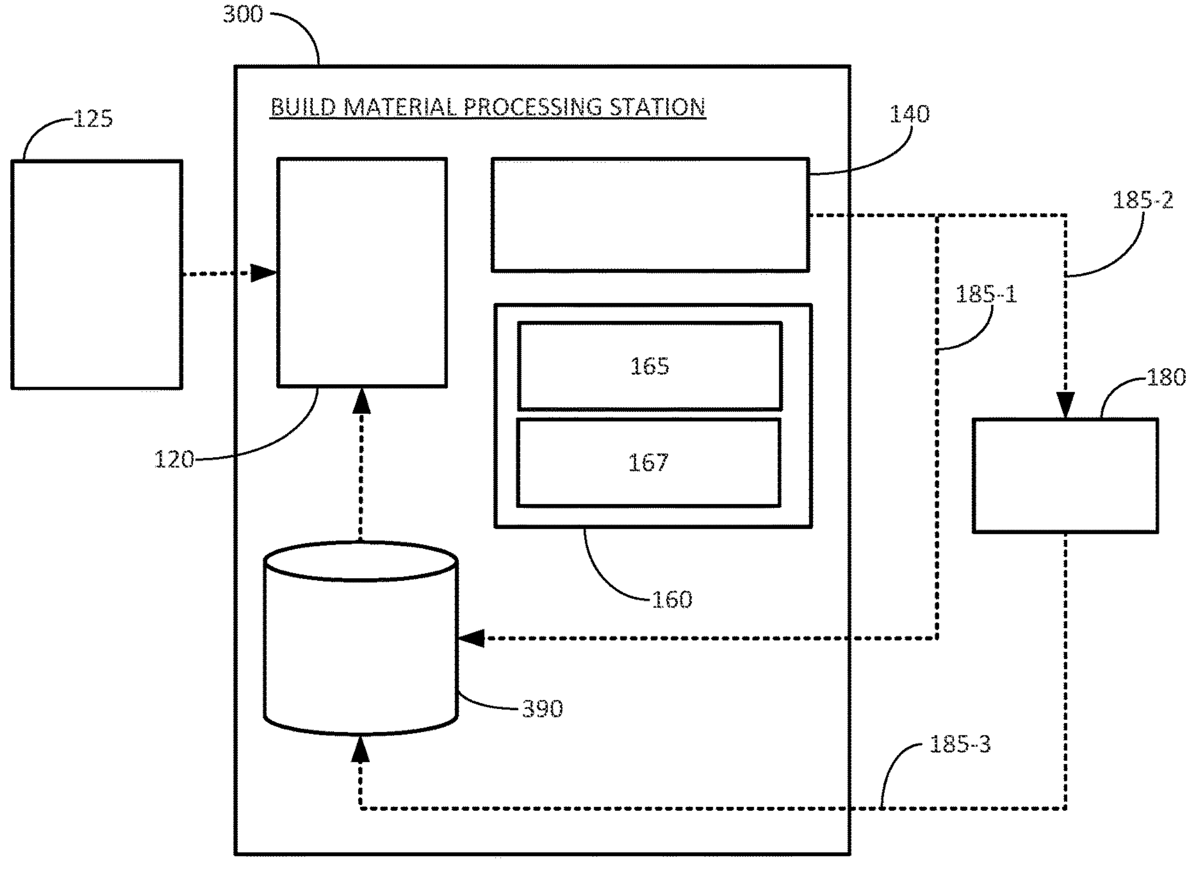
FIG. 3 schematically illustrates another example of a build material processing system.

FIG. 3 illustrates schematically another example of a build material processing system 300. The build material processing system 300 includes elements of the build material processing system 100 referred to with the same reference numerals. The build material processing system 300 includes the build volume interface 120, the build material removal device 140 and the controller 160. In some examples, the build material processing system 300 includes the reconditioning unit 180. In other examples, however, the reconditioning unit 180 may be external from the build material removal device 140 but connected to the build material removal device through, for example, the transportation means 185.

The build material processing system 300 further includes a mixer 390 (e.g., a blender). The mixer is to combine build material powders of different characteristics (e.g., recyclability degree) to be recycled and reused in foregoing print jobs. In some examples, the mixed build materials from the mixer 390 (referred hereinafter as recycled build material) might be loaded in the container 125. In other examples, the recycled build material is conveyed to a 3D printer. In the examples, the mixer 390 is to combine the reconditioned second portion of build material with virgin build material and/or at least part of the first portion of build material. In the examples herein, virgin build material should be interpreted as build material which has not experienced a thermal process and/or a 3D printing process.

In some examples, the different types of build material might be conveyed from the different elements of the build material processing station 300 through transportation means similar to the transportation means 185 of FIG. 1A. In the examples in which the first portion of build material is not reconditioned, the first portion of build material may be conveyed directly from the build material removal device 140 to the mixer 390 through, for example, through a first set of transportation means 185-1. In the examples in which the first portion of build material is to be reconditioned, the first portion of build material may be conveyed from the build material removal device 140 to the reconditioning unit 180 through a second set of transportation means 185-2. Likewise, the second portion of build material may be also conveyed from the build material removal device 140 to the reconditioning unit 180 through a second set of transportation means 185-2 in separate batches as of the first portion of build material, as both types of build material might be reconditioned in different reconditioning modes. In additional examples, the first and second portions of build material may be conveyed from the build material removal device 140 to the reconditioning unit 180 through different transportation means. Further, the build material processing station may further comprise (or be coupled to) a third set of transportation means 185-3 which are to convey build material (e.g., first and/or second portions of build material) from the reconditioning unit 180 to the mixer 390.

Figure 4:
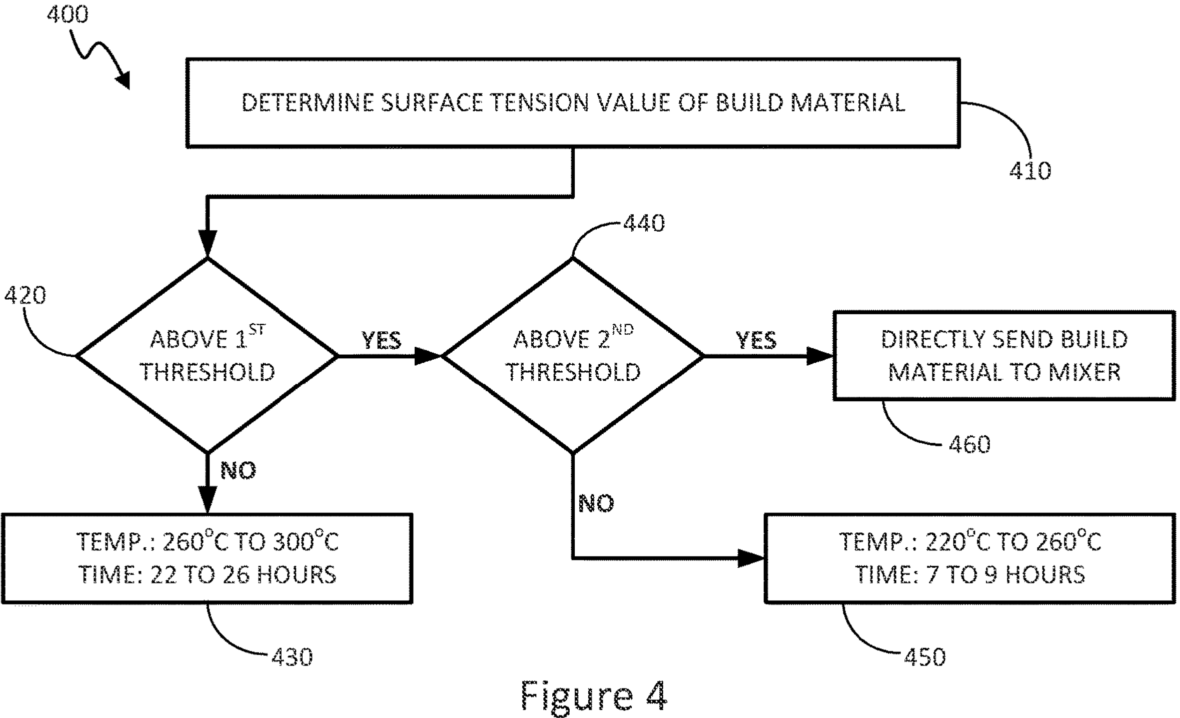
FIG. 4 is a flowchart of an example method of determining thermal processing parameters.

FIG. 4 is a flowchart of an example method 400 for determining thermally processing parameters. Method 400 includes processing blocks 410-460 which may be executed after block 260 of FIG. 2 to determine the time and temperature that the reconditioning unit 180 should work to recondition build material for its recyclability. Method 400 includes elements of the build material processing system(s) 100-300 referred to with the same reference numerals.

At block 410, the controller 160 or the user is to determine a surface tension value of build material (e.g., second portion of build material). In some examples, the surface tension is measured through a surface tension meter. Some examples of surface tension meters include a Goniometer, Tensiometer, Du Nouy ring tensiometer Wilhelmy plate tensiometer, Du Nouy-Padday method or a Bubble pressure tensiometer. Some of these surface tension meters methods may include pouring an amount of build material to a liquid glass (e.g., water glass) and introducing a plate (e.g., platinum plate). The angle between water and the plate is indicative of the surface tension. As an example, the surface tension of clean water is about 72 mN/m. A lower surface tension value of the build material is indicative that it is "muddier" and hence more contaminated and harder to recycle. As such, a build material with a lower surface tension value may be reconditioned for additional time and/or higher temperature than a build material with a higher surface tension value. In some examples, a build material with a surface tension value similar to clean water might not be subject to recondition as the recyclability of the particles is already acceptable.

At decision block 420, the controller 160 or the user is to determine if the determined surface tension value is above a first threshold. In some examples, the first threshold may be a value selected from the range defined by 50 and 60 mN/m, for example 55 mN/m. If the determined tension value is below the first threshold (NO decision), the reconditioning unit 180 is to raise the temperature of the build material to a temperature from the range of about 260° C. to about 300° C., for example 280° C.; for a period of time of the range of about 22 to about 26 hours, for example 24 hours (block 430). Otherwise, in some examples, if the determined tension value is above the first threshold (YES decision), block 460 may be executed. However, in other examples, if the determined tension value is above the first threshold (YES decision), decision block 440 may be executed.

At decision block 440, the controller 160 or the user is to determine if the determined surface tension value is above a second threshold. In some examples, the second threshold may be a value selected from the range defined by about 60 and about 80 mN/m, for example 70 mN/m. If the determined tension value is below the second threshold (NO decision), the reconditioning unit 180 is to raise the temperature of the build material to a temperature from the range of about 220° C. to about 260° C., for example 240° C.; for a period of time of the range of about 7 to about 9 hours, for example 8 hours (block 450). Otherwise, in some examples, if the determined tension value is above the second threshold (YES decision), the build material may be sent to a mixer for recycling (e.g., mixer 390 of FIG. 3).

Additionally, or alternatively, the controller 160 or the user may define additional threshold values. For example, a third threshold value of about 50 mN/m below which the build material should be discarded as no reconditioning might be possible.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processor, or a combination thereof.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

What it is claimed is:

1. A build material processing system comprising:

a build volume interface to receive a container including a build volume comprising a plurality of powdered build material layers in which an agent has been selectively applied to define a 3D object;

at least one type of build material removing device;

a controller to:

control the build material removing device to extract a first portion of the powdered build material layers in a first manner;

control the build material removing device to subsequently extract a second portion of the powdered build material layers in a second manner; and convey the extracted second portion of the powdered build material layers to a reconditioning unit; and a sensing module to determine a quality level of the second portion of the powdered build material layers, wherein the controller controls the reconditioning unit to treat the second portion of the powdered build material layers based on the determined quality level.

2. The build material processing system of claim 1 further comprising the reconditioning unit.

3. The build material processing system of claim 1, wherein the at least one type of the build material removing device comprises first and second different build material removal devices.

4. The build material processing system of claim 1, further comprising one or more ducts with at least one of a fan or a pump to convey the second portion of the powdered build material layers to the reconditioning unit.

5. The build material processing system of claim 1, further comprising a mixer to combine the treated second portion of the powdered build material layers with at least one of: virgin build material and build material extracted from the first portion of the powdered build material layers.

6. A method to process additive manufacturing build material, the method comprising:

receiving a build volume comprising a plurality of powdered build material layers in which a binder agent has been selectively applied to define a 3D object;

extracting a first portion of the powdered build material layers in a first manner;

extracting a second portion of the powdered build material layers in a second manner;

determining a quality level of the second portion of the powdered build material layers; and treating, by a reconditioning unit, the second portion of the powdered build material layers to remove any residual agent components therefrom based on the determined quality level.

7. The method of claim 6, further comprising combining the reconditioned second portion of the powdered build material layers with at least one of virgin build material and the first portion of the powdered build material layers.

8. The method of claim 6, wherein:

extraction of the first portion of the powdered build material layers in the first manner is to remove portions of the powdered build material layers that are located further away from the 3D object; and extraction of the second portion of the powdered build material layers in the second manner is to remove portions of the powdered build material layers that are located in neighboring portions of the 3D object.

9. The method of claim 6, further comprising:

receiving an input indicative of the quality level of the second portion of the powdered build material layers; and treating, by the reconditioning unit, the second portion of the powdered build material layers based on the quality level.

10. The method of claim 6, further comprising extracting the first and second portions of the powdered build material layers through different build material removal processes.

11. The method of claim 6, wherein reconditioning the second portion of the powdered build material layers includes raising a temperature of the second portion of the powdered build material layers to a temperature ranging from 220° C. to 260° C. during a time from a range of 7 to 9 hours.

12. The method of claim 6, further comprising:

determining a surface tension value of the second portion of the powdered build material layers;

if the surface tension value is above a first threshold, raising a temperature of the second portion of the powdered build material layers to a temperature ranging from 220° C. to 260° C. during a time from a range of 7 to 9 hours; and if the surface tension value is below the first threshold, raising the temperature of the second portion of the powdered build material layers to a temperature ranging from 260° C. to 300° C. during a time from a range of 22 to 26 hours.

13. The method of claim 12, further comprising:

determining that the surface tension value is above a second threshold higher than the first threshold; and directly sending the second portion of the powdered build material layers to a mixer.

14. The build material processing system of claim 1, wherein the build material processing system is part of a 3D printer.

15. The build material processing system of claim 1, wherein the at least one type of build material removing device includes at least one from a list comprising: a vibrating mechanism, a blowing device, a suction device, a brush, an acoustic resonator, and a magnet.

16. The build material processing system of claim 15, wherein the build material removing device is configured to remove at least a part of the plurality of powdered build material layers from the container.

17. The build material processing system of claim 1, wherein the reconditioning unit includes either or both of a heater and a set of conduits or hoses.

18. The build material processing system of claim 17, wherein the reconditioning unit is configured to treat build material to remove any residual agents or agent components therefrom.

* * * * *